United States Patent
Amamori

(10) Patent No.: US 7,261,317 B2
(45) Date of Patent: Aug. 28, 2007

(54) AIRBAG SYSTEM

(75) Inventor: Ichiro Amamori, Hikone (JP)

(73) Assignee: Takata Corporation, Tokyo (JP)

( * ) Notice: Subject to any disclaimer, the term of this patent is extended or adjusted under 35 U.S.C. 154(b) by 39 days.

(21) Appl. No.: 10/859,991

(22) Filed: Jun. 4, 2004

(65) Prior Publication Data

US 2005/0062269 A1    Mar. 24, 2005

(30) Foreign Application Priority Data

Sep. 22, 2003    (JP) ............................. 2003-329756

(51) Int. Cl.
*B60R 21/16* (2006.01)
(52) U.S. Cl. .................................................... 280/731
(58) Field of Classification Search ................. 280/731
See application file for complete search history.

(56) References Cited

U.S. PATENT DOCUMENTS 5,350,190 A * 9/1994 Szigethy ................. 280/728.2
6,193,267 B1 * 2/2001 Tichvon et al. .......... 280/728.2
6,719,323 B2   4/2004 Kai et al.
2005/0017484 A1 * 1/2005 Worrell et al. ............. 280/731
2005/0116452 A1 * 6/2005 Lee ............................ 280/731

FOREIGN PATENT DOCUMENTS

| JP | 04287768 A | * | 10/1992 |
| JP | 9030425 | | 2/1997 |
| JP | 10100832 | | 4/1998 |

* cited by examiner

*Primary Examiner*—Faye M. Fleming
(74) *Attorney, Agent, or Firm*—Manabu Kanesaka

(57) ABSTRACT

An airbag system includes an airbag, a retainer for retaining the airbag, a module cover having a vertical wall for covering an outer periphery of the airbag and capable of moving forward to approach the retainer and moving backward to return to an initial position, and a plate spring member mounted under the retainer and having an upper outer periphery portion for supporting the vertical wall of the module cover and for urging the module cover in a backward direction. A moving contact of a horn switch is provided to the module cover and brought into conduction when the module cover moves forward.

2 Claims, 8 Drawing Sheets ically) when the outer periphery of the plate spring member switches between the horizontal state (non-deformed state) and the downwardly deflected state (deformed state). Accordingly, it is possible to move the module cover smoothly and reliably, thereby ensuring preferable operation when the operator (driver) operates the horn.

AIRBAG SYSTEM

BACKGROUND OF THE INVENTION AND RELATED ART STATEMENT

The present invention relates to an airbag system including a horn switch, and more specifically, to an airbag system in which only a module cover moves to turn on the horn switch when the module cover is pushed.

A driver-seat airbag system mounted on a steering wheel of a car includes a retainer (base plate); an airbag disposed in the retainer in a folded state and having a gas inlet with periphery mounted to the retainer; a module cover covering the folded airbag; and a gas-generating inflator (gas generator) provided at an outer periphery side of the retainer in a radial direction. When the inflator is activated to generate gas, the airbag expands to tear open the module cover, so that the airbag deploys in a vehicle cabin to protect an occupant in a driver seat. A steering wheel generally has a function of blowing a horn (warning horn) in addition to a function of steering a car.

A driver-seat airbag system has been proposed in which a horn switch is turned on to blow the horn when a module cover is pushed (refer to Japanese Patent Publication (Kokai) No. 2001-114057). The airbag system is constructed such that the retainer is fixed to the steering wheel and only the module cover moves. Specifically, the retainer has a sidewall extending vertically from an outer periphery thereof, and a vertical wall of the module cover is supported on the outer periphery of the retainer sidewall to be movable vertically. A fixed-side contact is disposed on a fixed-side contact support section projecting from the outer periphery of the retainer sidewall, and a moving-side contact facing the fixed-side contact is disposed on a bracket provided on the outer periphery of the vertical wall of the module cover.

When an operator pushes the module cover, the module cover moves downwardly toward the retainer, so that the moving-side contact contacts the fixed-side contact to turn on the horn switch, thereby blowing the horn. When the module cover is released, the module cover is urged upwardly by a coil spring provided between the fixed-side contact and the moving-side contact (between the fixed-side contact support section and the bracket) to return to an initial position.

In the conventional airbag system, the fixed-side contact, the moving-side contact, and the coil spring for urging the module cover in the opposite directions are disposed at the outer periphery side of the airbag and the retainer. Accordingly, the entire airbag system inevitably becomes large in the radial direction, thereby making it difficult to reduce the size thereof.

In view of the problem described above, an object of the present invention is to provide an airbag system in which only a module cover moves to turn on a horn switch when pushed, thereby reducing a size of the airbag system.

Further objects and advantages of the invention will be apparent from the following description of the invention.

SUMMARY OF THE INVENTION

In order to achieve the above objects, according to a first aspect of the present invention, an airbag system includes an airbag; a retainer for retaining the airbag; a module cover having a vertical wall for covering an outer periphery of the airbag and capable of moving forward to approach the retainer and moving backward to return to an initial position; a plate spring member mounted under the retainer and having an upper outer periphery portion for supporting the vertical wall of the module cover and for urging the module cover in a backward direction; and a moving-side contact of a horn switch provided to the module cover and brought into conduction when the module cover moves forward.

According a second aspect of the present invention, an airbag system includes an airbag; a retainer for retaining the airbag; a module cover capable of moving forward to approach the retainer and moving backward to return to an initial position; urging mechanism for urging the module cover in the backward direction; and a moving-side contact of a horn switch provided to the module cover and brought into conduction when the module cover moves forward. The module cover has a vertical wall covering an outer periphery of the airbag, and the urging mechanism is formed of a plate spring mounted under the retainer and having an upper outer periphery portion for supporting the vertical wall of the module cover.

In the first and second aspects, the vertical wall of the module cover is placed on the upper outer periphery portion of the plate spring member, so that the module cover is urged. Accordingly, when the module cover is pushed from a normal state in which the plate spring member is in an approximately flat shape, the outer periphery of the plate spring member deflects downwardly to move the module cover downwardly (forward) toward the retainer. Accordingly, the moving-side contact of the horn switch contacts the fixed-side contact (first fixed-side contact provided at an outer periphery of the steering wheel in the radial direction, a second fixed-side contact provided at a central portion of the steering wheel in the radial direction, or a third fixed-side contact provided at a cover retracting section of the retainer) to turn on the horn switch, thereby blowing the horn. When the module cover is released from the pressure, the plate spring member recovers upwardly by the elasticity corresponding to the downward deformation, thereby returning the module cover to the initial position.

As described above, in the first and second aspects, the plate spring member is disposed under the retainer, and the vertical wall of the module cover is placed on the upper outer periphery portion of the plate spring member to be urged. Accordingly, at least the spring can be accommodated under the stacked structure of the airbag and the retainer. Consequently, the entire airbag system (module) can be made small in the radial direction as compared with a conventional airbag system in which a spring and contacts are provided outside the stacked structure of the airbag and the retainer.

As described above, when the module cover is pushed, the outer periphery of the plate spring member is deflected downwardly to move the module cover forward. When the module cover is released, the plate spring member recovers upwardly by the elasticity corresponding to the deflection of the plate spring member to move the module cover backward. The module cover is thus reciprocated (vertically) when the outer periphery of the plate spring member switches between the horizontal state (non-deformed state) and the downwardly deflected state (deformed state). Accordingly, it is possible to move the module cover smoothly and reliably, thereby ensuring preferable operation when the operator (driver) operates the horn.

According to a third aspect of the present invention, in the airbag system in the first or second aspect, the moving-side contact of the horn switch is disposed at a contact-mounting section of the module cover located at a position outside the vertical wall, so that the moving-side contact faces the first fixed-side contact provided on the outer periphery of the steering wheel in the radial direction.

Since the spring is disposed under the retainer, only the contacts are disposed outside the stacked structure of the airbag and the retainer. There is no spring around the contacts as in the conventional structure, thereby reducing the size of the part (contact mechanism) located outside the stacked structure and the size of the entire airbag system in the radial direction.

In the third aspect, a contact mechanism is formed of the moving-side contact provided to the airbag system (module) and the fixed-side contact (first fixed-side contact) provided to the steering wheel. Accordingly, it is possible to reduce the size of the steering wheel in addition to that of the airbag system by making the contact mechanism small. In the structure having the fixed-side contact at the steering wheel like the conventional structure, when a spiral spring is provided around the contacts, the steering wheel needs a space for the contacts and the spring. In the present invention, it is necessary to provide the space only for the contact, thereby reducing the size of the steering wheel in the radial direction.

According to a fourth aspect of the present invention, the airbag system in the first or second aspect further includes a contact support member provided separately from the steering wheel and fixed to a central portion of the steering wheel in the radial direction. The second fixed-side contact is provided to the contact support member for contacting the moving-side contact.

In general, an outer periphery of the steering wheel projects significantly in the radial direction from the central portion thereof connected to a steering shaft toward the outer periphery and a rear side of the vehicle. The outer periphery of the steering wheel is joined the central portion thereof through radially extending spokes. Accordingly, the outer periphery may shift relative to the central portion through the spokes. In such a case, when the moving-side contact is provided to the module cover and the fixed-side contact is provided to the steering wheel, the contacts may shift. In the fourth aspect of the present invention, the fixed-side contact (second fixed-side contact) is mounted to the center portion through the contact support member, not to the outer periphery of the steering wheel, thereby eliminating the relative shift and ensuring preferable and reliable switching operation.

According to a fifth aspect of the present invention, in the airbag system in the first or second aspect, the moving-side contact is provided to a retainer retracting section of the vertical wall of the module cover. The retainer retracting section approaches to contact the retainer when the module cover moves forward, and separates from the retainer when the module cover moves backward. The retainer includes the third fixed-side contact at a cover retracting section facing the retainer retracting section in the retracting direction, so that the third fixed-side contact contacts the moving-side contact.

In the fifth invention, the moving-side contact is provided to the retainer retracting section of the vertical wall of the cover, and the fixed-side contact (third fixed-side contact) is provided to the cover retracting section of the retainer. Accordingly, it is possible to dispose the spring and the moving-side and fixed-side contacts in the stacked structure of the airbag and the retainer, thereby eliminating a component outside the stacked structure, and further reducing the size of the airbag system in the radial direction.

According to a sixth aspect of the present invention, the airbag system in one of the first to fifth aspects further includes a shape retaining member provided at an inner side of the module cover relative to the vertical wall in the radial direction for restraining and retaining a shape of the folded airbag. The shape retaining member restrains the folded airbag in the module cover, so that a space is formed for the module cover to move vertically between an upper part of the airbag and the module cover, thereby obtaining reliable operation.

According to a seventh aspect of the present invention, in the airbag system in one of the first to sixth aspects, the plate spring member is divided into one part for supporting one side of the vertical wall of the module cover and another part for supporting the other side of the vertical wall. The plate spring member is divided into the two parts to separately support one side and the other side of the vertical wall. Accordingly, when one side of the module cover is pushed, the pressure is applied only to one of the two parts of the plate spring that supports the one side of the module cover, so that the module cover is urged only with the torsional force of the plate spring. Similarly, when the other side of the module cover is pushed, the pressure is applied only to the other of the two parts of the plate spring that supports the other side of the module cover, so that the module cover is urged only with the torsional force of the plate spring.

On the other hand, when the operator pushes a side of the module cover in a direction perpendicular to the one side and the other side, the pressure is applied to the two plate springs, thereby urging the module cover to recover with the deformation of the two springs. The same is applied to another side in the perpendicular direction. Accordingly, it is possible to change the urging force depending on a position of the module cover that is pushed, thereby changing a pushing force or operating feeling necessary for the horn operation.

Further, when the plate spring member is divided into the two parts and a space between the two parts is increased to reduce sizes of the two parts, it is possible to reduce manufacturing cost.

According to the present invention, the plate spring member is provided under the retainer, and the vertical wall of the module cover is placed on the upper outer periphery thereof. At least the spring is placed under the stacked structure of the airbag and the retainer. Accordingly, the entire airbag system can be radially reduced in size as compared to the conventional structure in which a spring and a contact are provided outside the stacked structure of the airbag and the retainer.

DETAILED DESCRIPTION OF PREFERRED EMBODIMENTS

Figure 1:
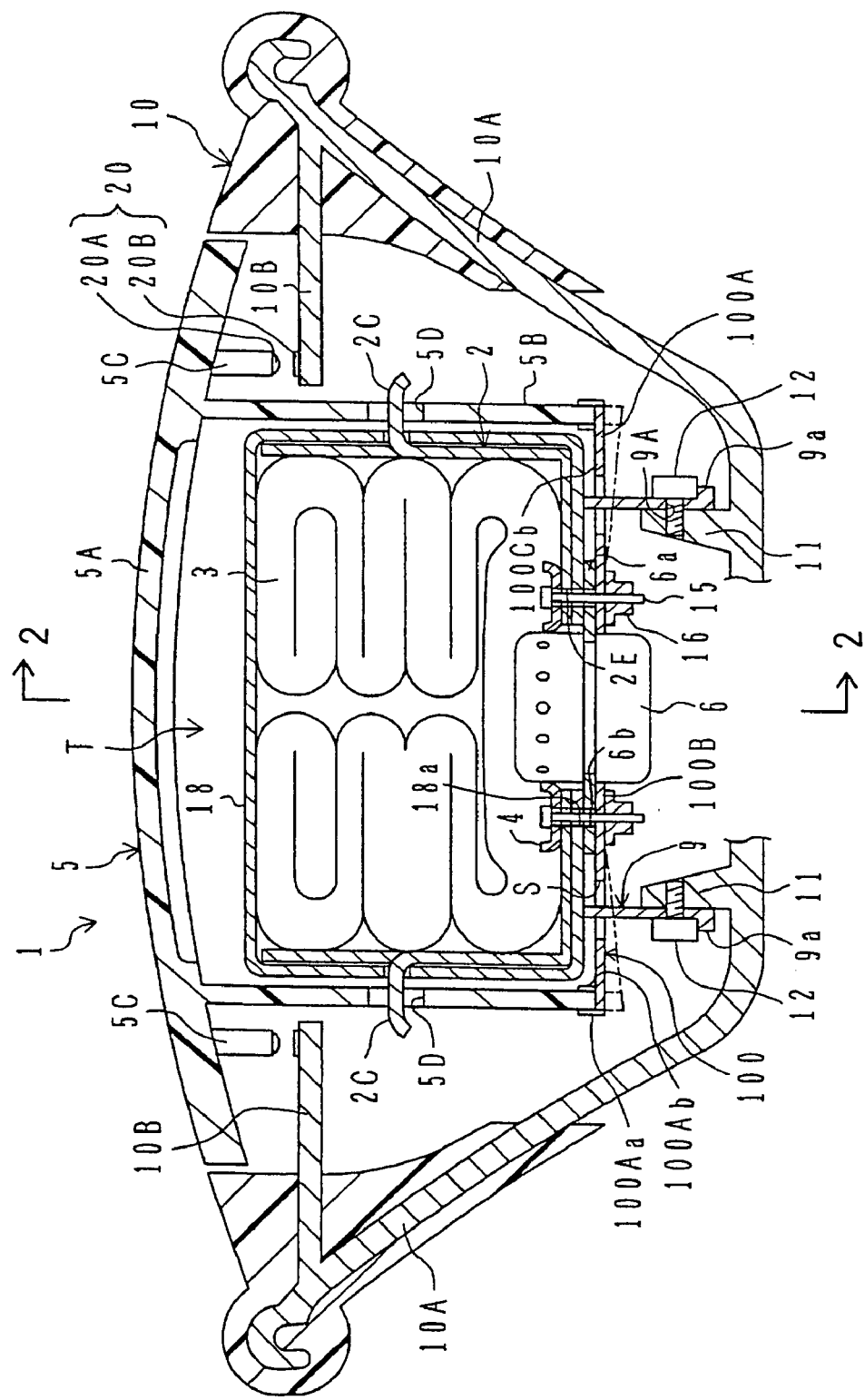
FIG. 1 is a longitudinal sectional view of a driver seat airbag system and a steering device according to an embodiment of the present invention.

Hereunder, embodiments of the present invention will be described with reference to the accompanying drawings. FIG. 1 is a longitudinal sectional view of a driver seat airbag system and a steering device according to an embodiment of the present invention, and FIG. 2 is a cross sectional view taken along line 2-2 in FIG. 1.

Figure 2:
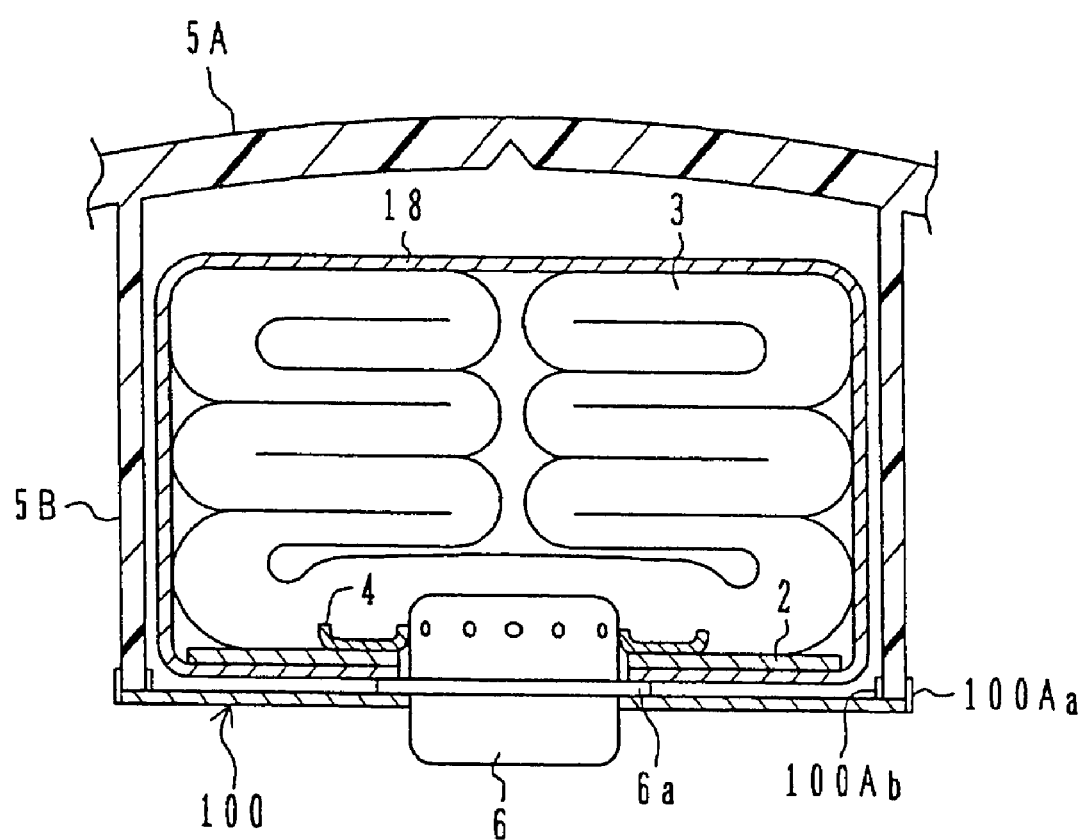
FIG. 2 is a cross sectional view taken along line 2-2 in FIG. 1.

As shown in FIGS. 1 and 2, an airbag system 1 includes a retainer 2, an airbag 3 mounted on the retainer with airbag-mounting rings 4, an inflator 6 for inflating the airbag 3, a module cover 5 that covers the folded airbag 3, and a plate spring (plate spring member) 100 serving as urging means and made of, for example, an iron-plate spring member.

The folded airbag 3 is restrained to retain a shape and not to expand with a shape-retaining member 18. The shape-retaining member 18 has through-holes 18a for bolts 15 (described later) to pass through. When the airbag 3 inflates, the shape-retaining member 18 is torn open or deformed to release the airbag 3.

The module cover 5 includes an upper part 5A for covering an upper part of the airbag 3; a vertical wall 5B with an approximately rectangular-cylinder shape projecting downwardly from a radially outer periphery of a backside of the upper part 5A and covering the outer periphery of the airbag 3; and a plurality of (for example, four) contact support sections (contact-mounting sections) 5C projecting downwardly from the radially outer periphery side of the backside of the upper part 5A with respect to the vertical wall 5B. The module-cover upper part 5A has a specific space T between a backside thereof and the shape-retaining member 18 for allowing the module cover 5 to move vertically in FIG. 1.

Figure 3:
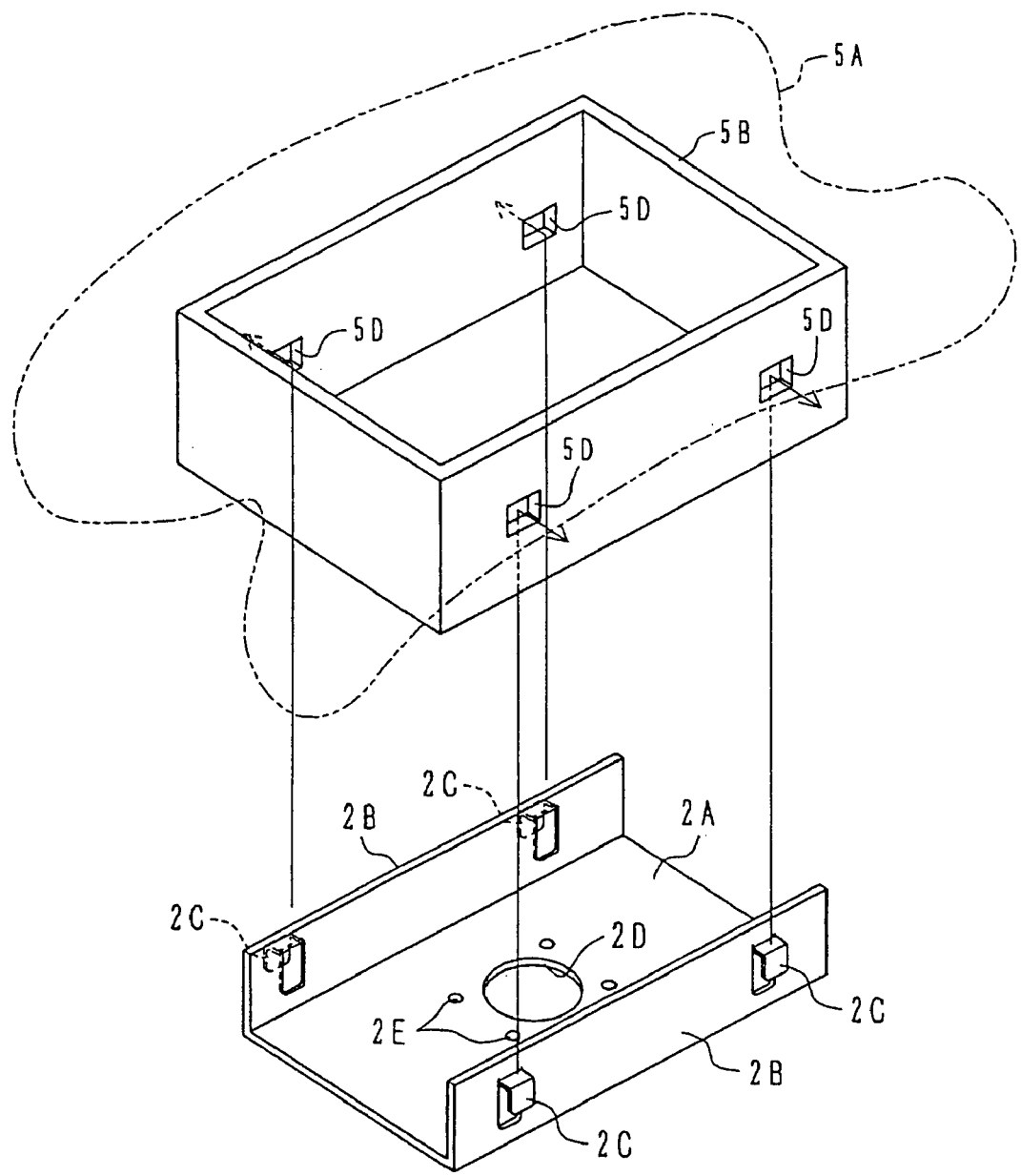
FIG. 3 is an exploded perspective view of an engagement between a vertical wall of a module cover and a retainer.

FIG. 3 is an exploded perspective view of an engagement between the module-cover vertical wall 5B and the retainer 2. As shown in FIGS. 3 and 1, the retainer 2 has a base 2A of an approximately square-flat-plate shape for supporting the airbag 3 thereon, and the radially inner periphery thereof is fixed from above with the rings 4. The inflator 6 is mounted to the lower part of the retainer 2 through the shape-retaining member 18, side walls 2B rising from two sides of the four sides of the approximate square of the base 2A, and two engaging pieces (hook) 2C projecting outwardly from each of the side walls 2B having an approximately L-shape. The engaging pieces 2C pass through-holes provide in the corresponding positions of the shape-retaining member 18, and then inserted into openings 5D provided in the corresponding positions of the module-cover vertical wall 5B (refer to FIG. 3). A vertical size of the opening 5D is larger than that of the retainer engaging piece 2C so as to allow the module cover 5 to shift vertically relative to the retainer 2 (described later). The base 2A also has an approximately circular through-hole 2D in the radially central portion for the inflator 6 to pass through and through-holes 2E around the outer periphery of the through-hole 2D for the bolts 15 (later described) to pass through.

Projections 9 (not shown in FIG. 3) project downwardly from the backside of the base (retainer body) 2A through-holes (not shown) in the shape-retaining member 18. Each projection 9 has an opening 9A for a bolt 12 to pass through. A bracket 11 projects upwardly from the core metal 10A of a steering wheel 10. The bolt 12 passes through the opening 9A and is screwed into a female screw hole of the bracket 11, so that the projection 9 is fixed to the bracket 11. The retainer 2 is thus fixed to the steering-wheel core metal 10A. An end of the projection 9 has a bent hook 9a for receiving a head of the bolt 12 to position. Contact-supporting arms 10B are branched from the radially outer periphery of the steering-wheel core metal 10A in an approximately horizontal direction in the embodiment (or in a direction perpendicular to the retracting direction of the module cover 5).

Figure 4:
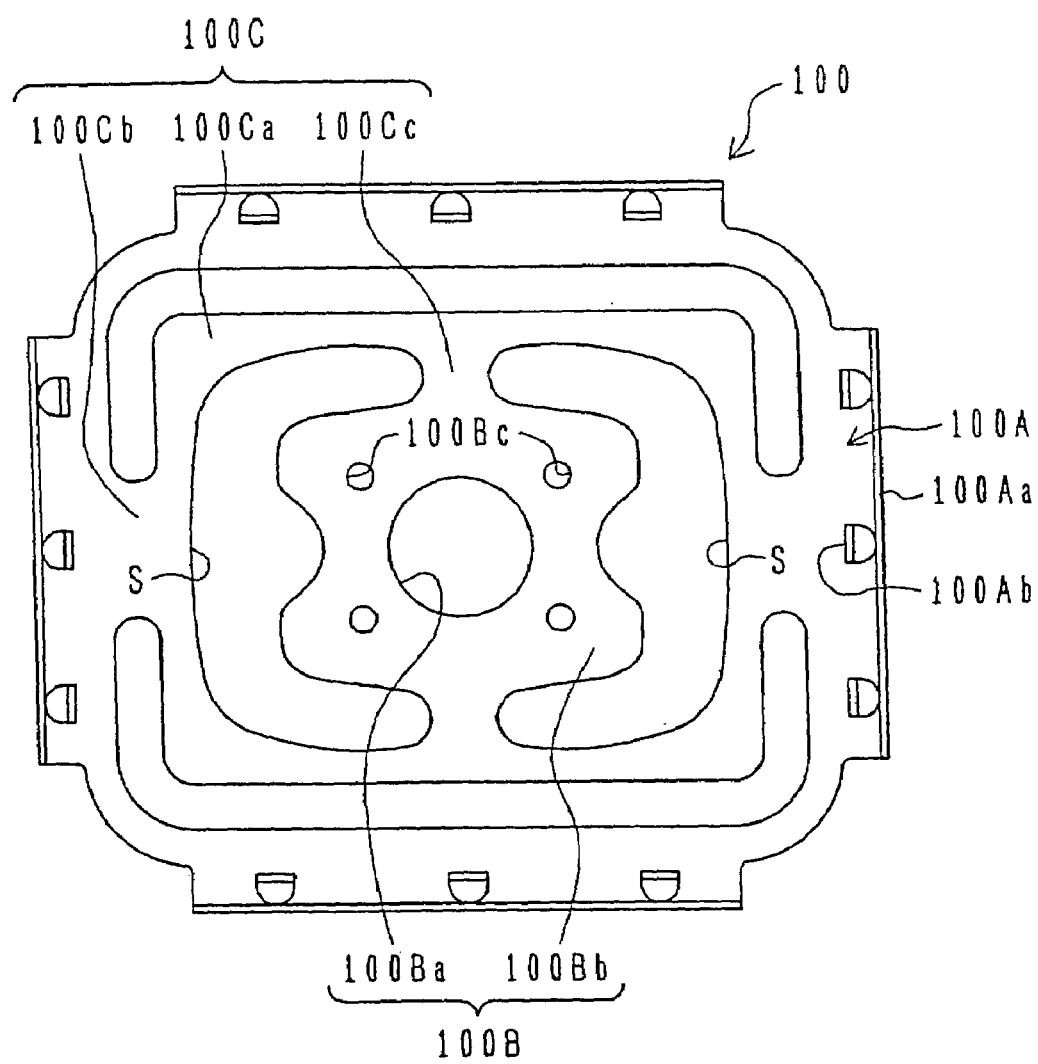
FIG. 4 is a top view of a detailed structure of a plate spring.

FIG. 4 is a top view of a detailed structure of the plate spring 100. As shown in FIGS. 4 and 1, the plate spring 100 is mounted to a bottom surface of the retainer 2 through a flange 6a (described later) of the inflator 6, and is in a substantially flat-plate shape except at louver or bent portions (described later). Specifically, the plate spring 100 has an approximately square-frame-shaped outer rim 100A on the outer periphery side, a through-support section 100B provided in the radially central portion thereof for passing the inflator 6 therethrough, and a middle joint section 100C provided between the outer rim 100A and the through-support section 100B so as to joint them.

Figure 8:
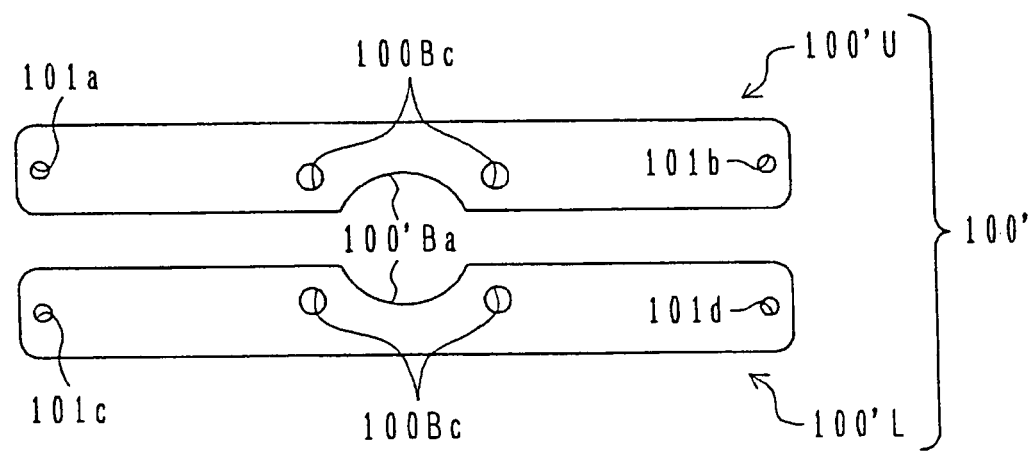
FIG. 8 is a top view of a divided structure of a plate spring according to a still further embodiment of the present invention.
Figure 9:
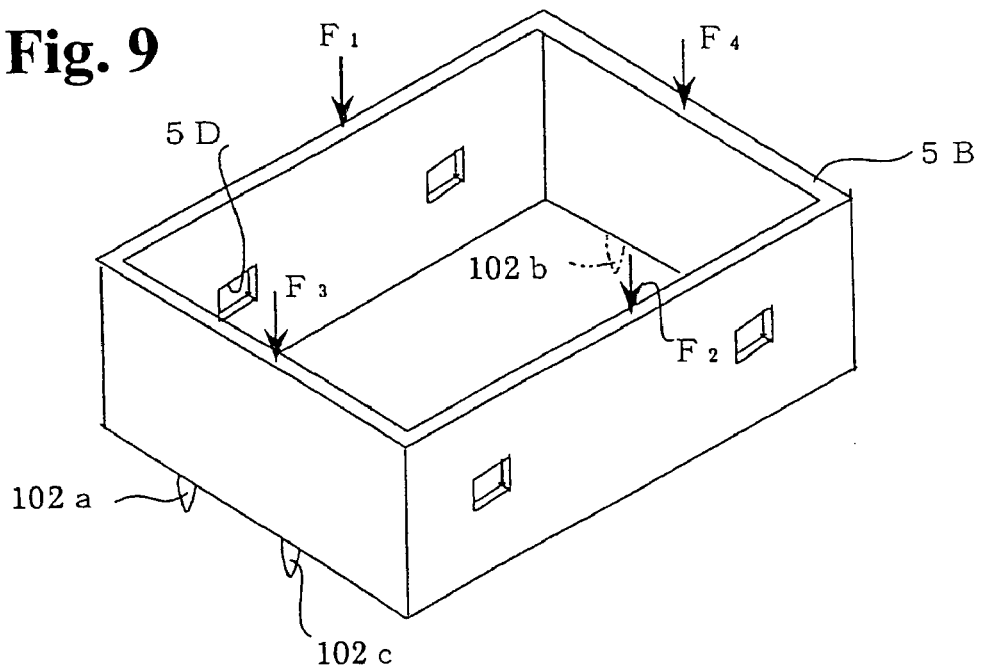
FIG. 9 is a perspective view showing the module cover shown in FIG. 3 having engaging projections.

The outer rim 100A supports a lower end of the approximately square-cylinder-shaped module-cover vertical wall 5B (any of a fixed structure, an unfixed structure placed with its own weight, and an engaged structure with projections and depressions placed with its own weight, for example, refer to FIGS. 8 and 9), and has four guide frames 100Aa for guiding and protecting the lower end of the vertical wall 5B from opposite sides when the vertical wall 5B is supported and elastically deformed (indicated by hidden lines in FIG. 1) and a large number of (12 in the embodiment) louver portions 100Ab. The guide frames 100Aa are formed by bending four sides of a flat square plate (approximately square shape cut in R-shape) of the plate spring 100 substantially vertically. The louver portions 100Ab are formed by cutting the corresponding portions of the flat plate and raising the portions substantially vertically.

The through-support section 100B has a through-hole 100Ba for the inflator 6 to pass through and bolt-inserting section 100Bb positioned around the outer periphery and having through-holes 100Bc for the bolts 15 to pass through.

The middle joint section 100C has a frame 100Ca having an approximately square-frame shape; two outer bridges 100Cb positioned on an outer periphery side of the frame 100Ca and connected to the outer rim 100; and two inner bridges 100Cc positioned on an inner periphery side of the frame 100Ca and connected to the through-support section 100B. As shown in FIG. 4, the two outer bridges 100Cb and the two inner bridges 100Cc are 90 degrees out of phase in a staggered arrangement relative to the through-hole 100Ba in the radially central portion (where straight lines connecting the two bridges intersect each other) so that it provides smooth elasticity.

The foregoing structure provides slots S having, for example, an E- or inverse E-shape between the through-support-section bolt-inserting section 100Bb and the middle-joint-section frame 100Ca. The above-mentioned projections 9 are arranged to pass through the slots S (refer to FIG. 1).

As shown in FIGS. 1 and 2, the inflator 6 includes the flange 6a. The flange 6a has a plurality of (for example, four) bolt-inserting holes 6b. The bolts 15 each projecting downwardly through the ring 4 pass through the retainer through-holes 2E, the shape-retaining-member through-holes 18a, the inflator bolt-inserting holes 6b, and the bolt-inserting-section through-holes 100Bc of the plate spring 100 in that order, and nuts 16 are tightened to the bolts 15. The plate spring 100 is thus fixed to the retainer 2.

A horn switch 20 is interposed between the contact-supporting arm 10B of the steering wheel 10 and the contact support sections 5C of the module cover 5. The horn switch 20 has a moving-side contact 20A mounted to the lower end of the module-cover contact support sections 5C and a fixed-side contact (first fixed-side contact) 20B mounted to the steering wheel contact-supporting arm 10B. The contacts are opposed in the reciprocating direction of the module cover 5 (vertically in FIG. 1). The module cover 5 moves vertically in FIG. 1 as described above, wherein when the module cover 5 is pushed, the moving-side contact 20A contacts the fixed-side contact 20B to close the horn switch 20 (ON state), thereby blasting the horn.

In the embodiment, the airbag system 1 with such a structure has the module-cover vertical wall 5B on the outer rim 100A of the plate spring 100 for urging upwardly. Accordingly, when an operator (normally, a driver) pushes the module cover 5 to turn on the horn switch 20, the outer periphery of the plate spring 100 deflects downwardly from the normal planar shape (refer to hidden lines in FIG. 1) to move the module cover 5 downwardly (forward) to approach the retainer 2. Accordingly, the moving-side contact 20A mounted to the lower end of the module-cover contact support section 5C is brought into contact with the fixed-side contact 20B mounted to the steering-wheel contact-supporting arm 10B to turn on the horn switch 20, thereby blowing the horn. When the operator releases the module cover 5, the plate spring 100 recovers backward upwardly by the repelling force of the plate spring 100 (elastic response to the downward deflection), thereby returning the module cover 5 to the initial position.

According to the embodiment, as described above, the plate spring 100 is provided under the retainer 2, and the module-cover vertical wall 5B is placed on the upper outer periphery thereof to be urged. The spring can thus be placed under the stacked structure of the airbag 3 and the retainer 2. Thus, the entire airbag system (module) 1 can be reduced radially in size as compared with a conventional structure in which a spring and contacts are provided on the outer periphery side of the stacked structure of the airbag and the retainer. Particularly, since the spring is arranged under the retainer, only the contacts 20A and 20B remain on the outer periphery side of the stacked structure of the airbag 3 and the retainer 2, thereby eliminating the spring around the contacts as in the conventional structure. Accordingly, the contact mechanism (horn switch 20), located on the outer periphery side of the stacked structure can be reduced in size.

In the embodiment, the moving-side contact 20A provided to the airbag system (module) 1 and the fixed-side contact 20B provided to the steering wheel 10 construct the horn switch 20, as described above. Accordingly, it is possible to reduce the sizes of the airbag system 1 and the steering wheel 10 (detailed illustration is omitted) through reducing the size of the horn switch 20. More specifically, when the spiral spring is provided around the contacts in the structure having the fixed-side contact at the steering wheel as in the conventional system, the steering wheel needs a space for the contacts and the spring. In the present invention, it is necessary to have a space only for the contacts. For example, the radial size of the steering wheel 10 can be reduced through substantially omitting the part of the upper part 5A of the module cover 5 adjacent to the outer periphery (left and right of FIG. 1) with respect to the contact support sections 5C and decreasing a length of the contact-supporting arm 10B (not shown).

In the embodiment, the outer periphery of the plate spring 100 is deflected downwardly to move the module cover 5 forward when pressure is applied; the plate spring 100 recovers upwardly by the elasticity corresponding to the deflection of the lower part when the pressure is released, thereby moving the module cover 5 backward. The module cover 5 is thus reciprocated (vertically) by the switching of the outer periphery of the plate spring 100 between the horizontal state (non-deformed state, indicated by the solid lines in FIG. 1) and the deflected state of the lower part (deformed state, indicated by the hidden lines of FIG. 1). This allows smooth and reliable reciprocating motion, thus ensuring preferable operability when the operator (driver) operates the horn.

In the embodiment, the shape-retaining member 18 is provided on the side of the radially inner periphery with respect to the module cover vertical wall 5B for restraining and retaining the (upper) shape of the folded airbag 3. Since the expansion of the airbag 3 is prevented by restraining the folded airbag 3 in the module cover 5, the space T can be ensured as an empty space for the module cover 5 to move vertically between the upper part of the airbag 3 and the module-cover upper part 5A, thereby providing the operator with more preferable horn operability.

In the embodiment, the fixed-side contact 20B of the horn switch 20 is supported from the outer periphery of the steering wheel 10 through the contact-supporting arm 10B, and the invention is not limited to the embodiment. The contact may be supported from the radially central portion of the steering wheel 10.

Figure 5:
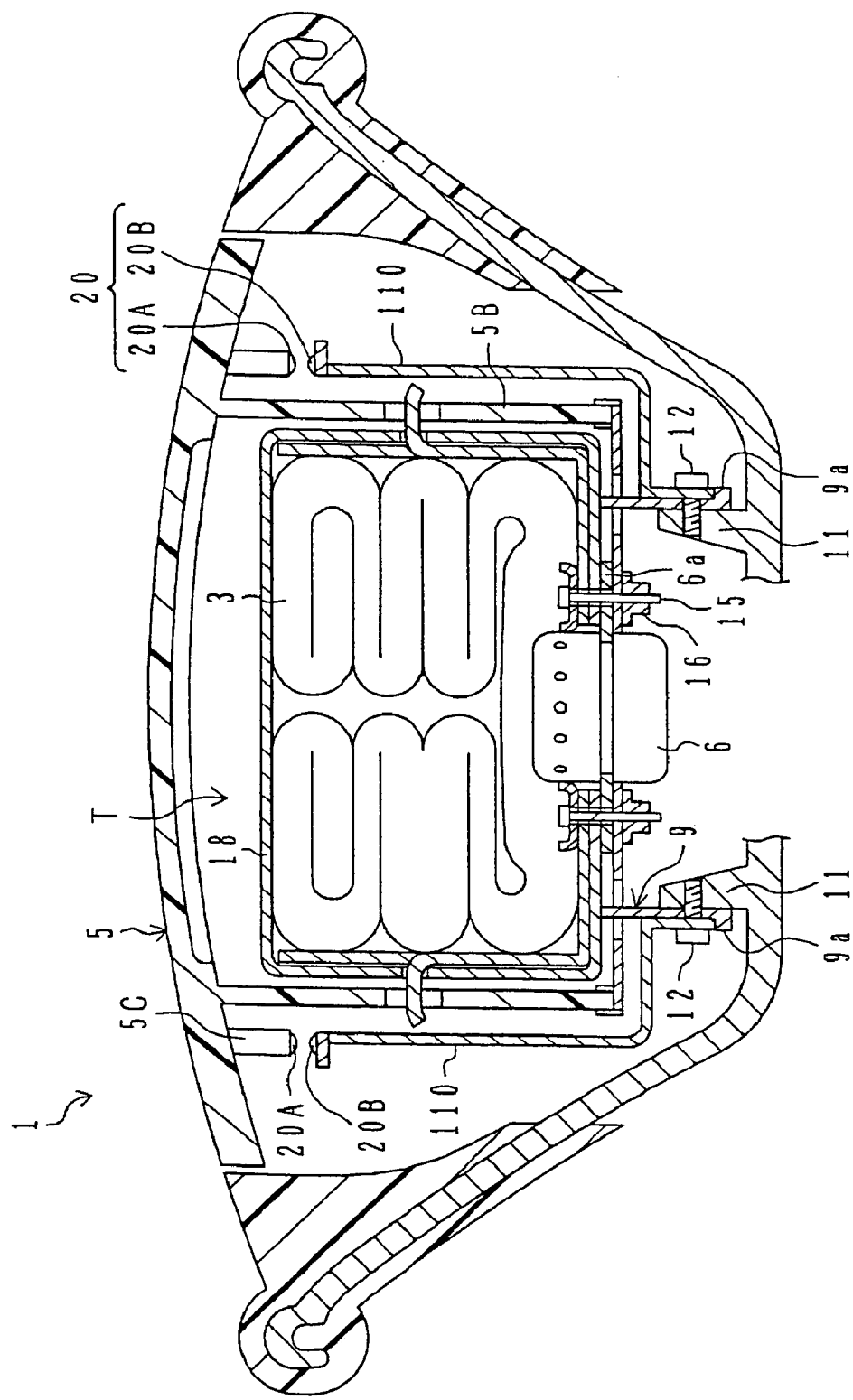
FIG. 5 is a longitudinal sectional view of an airbag system in which a horn switch is supported on a central portion of a steering wheel in a radial direction according to another embodiment of the present invention.

FIG. 5 is a longitudinal sectional view of an airbag system corresponding to FIG. 1 according to another embodiment of the present invention. The components equivalent to those in FIG. 1 are given the same reference numerals. As shown in FIG. 5, the fixed-side contact 20B (second fixed-side contact) is disposed at the end (top) of an approximately L-shaped contact support member 110 provided separately from the steering-wheel core metal 10A such that the fixed-side contact 20B vertically faces the moving-side contact 20A. The contact support member 110 has an opening 110A for the bolt 12 to pass through. The contact support member 110 is arranged on the outer periphery side of the projection 9 such that the opening 110A and the opening 9A of the projection 9 coincide with each other.

The bolt 12 passes through the opening 110A and the opening 9A, and is screwed into a female screw hole in the bracket 11, so that the contact support member 110 is fixed to the bracket 11 together with the projection 9 with the bolt 12. The contact support member 110 is thus fixed to the core metal 110A in the radially central portion of the steering wheel 10 together with the retainer 2. The hook 9a of the projection 9 has a function of receiving and positioning a head of the contact support member 110.

In this embodiment, it is possible to obtain the following advantages in addition to advantages similar to those described above. The radially outer periphery of the steering wheel 10 projects greatly from the radially central portion joined to the steering shaft toward the radially outer periphery and the rear side in the travel direction of the vehicle joined to the radially central portion through a radially extending spoke. The radially outer periphery may be shifted relative to the radially central portion through the spoke. The moving-side contact 20A is provided to the module cover 5 supported by the radially central portion of the steering wheel 10 through the plate spring 100, the retainer 2, and the projections 9, and contacts with the fixed-side contact 20B supported by the radially outer periphery of the steering wheel 10 through the contact-supporting arms 10B. In that case, the contacts 20A and 20B may be shifted relative to each other. In the embodiment, it is possible to prevent the relative shift by mounting the fixed-side contact 20B to the radially central portion of the steering wheel 10 through the contact support member, thereby ensuring preferable and reliable switching operation.

Since the contact support member 110 is provided separately from the steering-wheel core metal 10A, the horn switch can be mounted to various steering wheels 10 with different sizes and shapes with relatively high flexibility.

While the horn switch 20 is disposed on the outer periphery side of the module-cover vertical wall 5B, the invention is not limited to that. The horn switch may be constructed using the relative vertical motion of the module cover 5 and the retainer 2.

Figure 6:
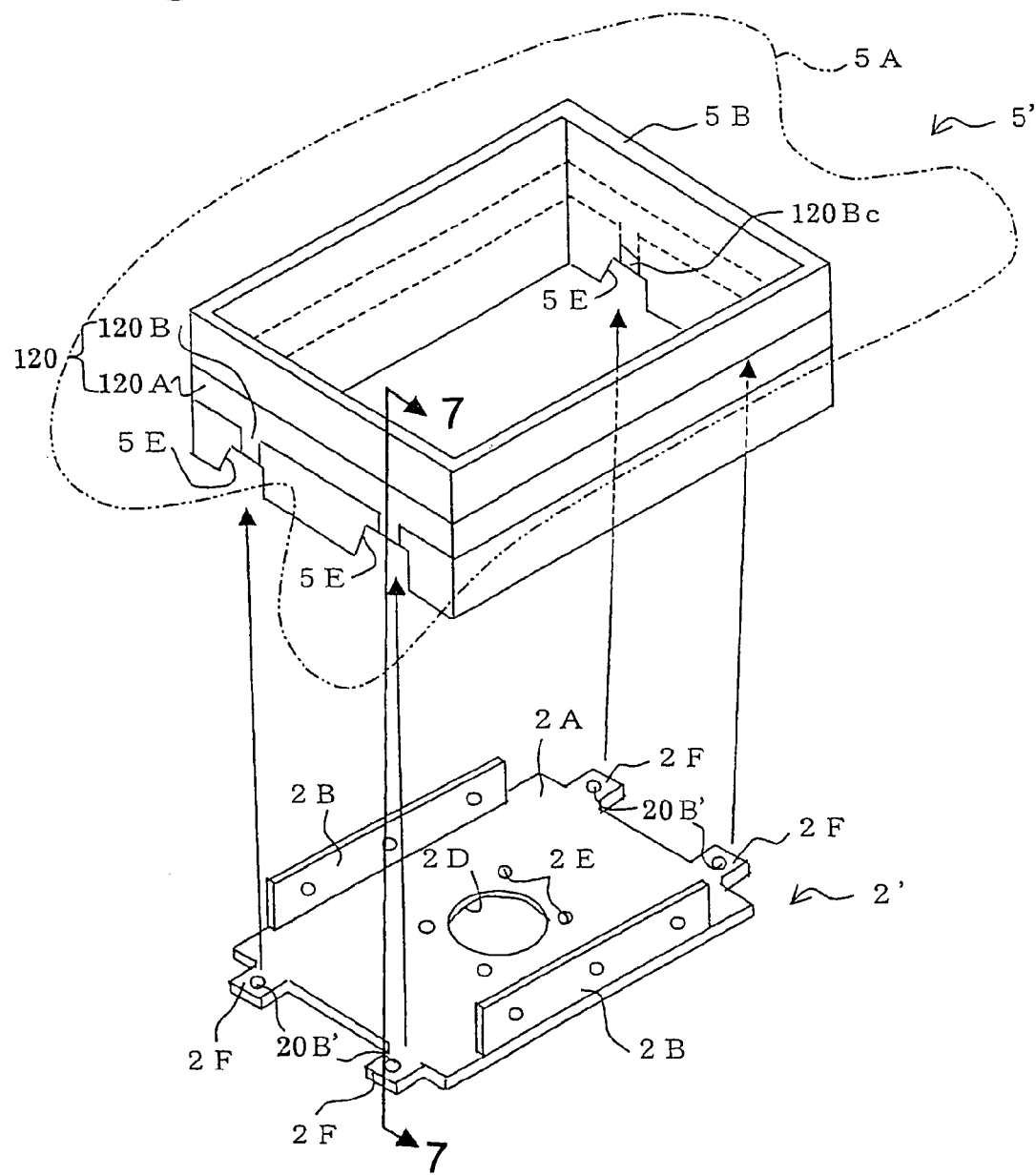
FIG. 6 is an exploded perspective view showing an engagement between a vertical wall of a module cover and a retainer in which a horn switch is turned on when the module cover moves vertically relative to the retainer according to a further embodiment of the present invention.
Figure 7:
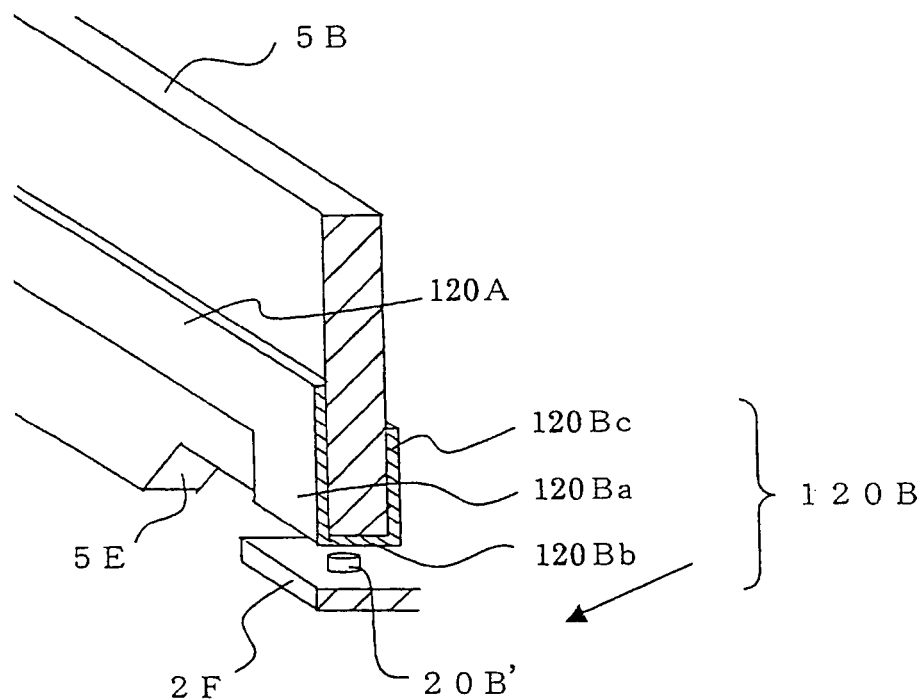
FIG. 7 is an enlarged cross-sectional view taken along line 7-7 in FIG. 6 (in an assembled state)

FIG. 6 is an exploded perspective view of an engagement between the module-cover vertical wall 5B and the retainer 2 corresponding to FIG. 3 according to a further embodiment of the present invention. The components same as those in FIG. 3 are given the same reference numerals and their descriptions are omitted. FIG. 7 is an enlarged cross-sectional view taken along line 7-7 in FIG. 6 (in an assembled state).

As shown in FIGS. 6 and 7, a retainer 2' of this embodiment has two engaging tabs (cover retracting section) 2F at each of two sides of the base 2A having an approximately square flat plate shape with no sidewall 2B. The engaging pieces 2C projecting outwardly from the sidewalls 2B in the retainer 2 are omitted here.

In this embodiment, the vertical wall 5B of a module cover 5' has four cut portions (retainer retracting section) 5E at positions corresponding to the tabs 2F of the retainer 2' of the lower end thereof. A conductive member 120 made of, for example, a conductive thin film (foil or a thin plate) is mounted mainly to the outer periphery of the approximately square cylinder. The conductive member 120 has a belt-like section 120A provided over the whole circumference in the middle of the vertical wall 5B in the height direction (axial direction) and four bent portions (tabs) 120B corresponding to the cut portions 5E. As shown in FIG. 7, each bent portion 120B has a downwardly extending section 120Ba branched downwardly from the belt-like section 120A and extending along the outer peripheral face of the vertical wall 5B; a horizontally extending section 120Bb extending horizontally at the end of the downward extending section 120Ba and along the upper wall of the cut portion 5E and bending at approximately 90 degrees; and an upwardly extending section 120Bc extending upwardly at the end of the horizontally extending section 120Bb and along the inner peripheral face of the vertical wall 5B and bending at approximately 90 degrees. Such bent structure allows firm locking to the vertical wall 5B.

A fixed-side contact (third fixed-side contact) 20B' of the horn switch 20 is disposed on each tab 2F of the retainer 2' so as to face the horizontally extending section 120Bb. When the module cover 5 is pushed, the bent-portion horizontally extending sections 120Bb of the conductive member 120 serving as moving-side contacts contact the fixed-side contacts 20B' to close the horn switch 20 (into conductive ON state), thereby blasting the horn. Since the other components are the same as those in the foregoing embodiment, their descriptions are omitted.

In this embodiment, the module-cover vertical wall 5B has the function of the moving-side contact, and the tabs 2F of the retainer 2' have the function of the fixed-side contacts 20B'. Accordingly, not only the spring but also the moving-side contact and the fixed-side contacts can be accommodated in the stacked structure of the airbag 3 and the retainer 2' with no components on the outer periphery side of the stacked structure of the airbag 3 and the retainer 2'. This allows the entire airbag system 1 to be further reduced in size radially.

In the embodiment, the moving-side contacts and the fixed-side contacts are constructed of the tabs 2F' of the retainer 2' and the corresponding conductive-member bent-portion horizontally extending sections 120Bb of the cut portions 5E provided at the lower end of the module-cover vertical wall 5B. The present invention, however, is not limited to the embodiment. For example, in the structures shown in FIGS. 1 and 3 according to the embodiments, it is also possible to dispose the fixed-side contact 20B' on the engaging piece 2C and provide the conductive member horizontally on the top wall of the vertically opposed opening 5D to contact with each other to turn on the horn when the module cover 5 moves forward to the retainer 2 as described above.

Although the embodiments have the integrated plate spring 100, the present invention is not limited to the embodiments, and may have, for example, a two-divided plate spring.

FIG. 8 is a top view of a detailed structure of a plate spring 100' having such a structure corresponding to. FIG. 4. The components similar to those in FIG. 4 are given the same reference numerals and their descriptions are omitted. As shown in FIG. 8, the plate spring 100' of this embodiment is divided into one divided piece 100'U and the other divided piece 100'L.

The divided pieces 100'U and 100'L each have an arc 100'Ba corresponding to the through-hole Ba for the inflator 6 to pass through and the through-holes 100Bc for the bolts 15 to pass through. Both of the module covers 5 and 5' can be applied to the plate spring 100'. In that case, the divided pieces 100'U and 100'L have engaging through-holes 101a to 101d for positioning and guiding (later described) in the vicinity of opposite ends. The module covers 5 and 5' also have engaging projections (pins) correspondingly.

FIG. 9 shows an example in which the module cover 5 in FIG. 3 has the engaging projections 102a to 102d. For example, of the four projections 102a to 102d, the projections 102a and 102c at one lower end of the vertical wall 5B are inserted to engage the through-hole 101a of the divided piece 100'U and the through-hole 101c of the other divided piece 100'L, respectively. The projections 102b and 102d (not shown) at the other lower end of the vertical wall 5B are inserted to engage the through-hole 101b of the divided piece 100'U and the through-hole 101d of the other divided piece 100'L, respectively. The module-cover vertical wall 5B thus be supported by the divided piece 100'U at one side (left upper side in FIG. 9, projections 102a and 102b) and supported by the divided piece 100'L at the other side (right lower side in FIG. 9, projections 102c and 102d); in other words, it is separately supported by the two pieces 100'U and 100'L.

The embodiment offers the following advantages. The plate spring 100' is divided into two portions, the divided pieces 100'L and 100'L, to separately support one side and the other side of the vertical wall 5B. Accordingly, when an operator pushes one side of the module cover 5 (refer to the arrow F1 in FIG. 9) at the time of horn operation, the pressure is applied only to the corresponding divided piece 100'U to urge the module-cover vertical wall 5B only with the torsional force of the single divided piece 100'U. Also, when the other side of the module cover 5 is pushed (refer to the arrow F2 in FIG. 9), the module cover 5 is urged only with the torsional force of the corresponding divided piece 100'L.

On the other hand, when the operator pushes one side in the direction perpendicular to the one side and the other side (refer to the arrow F3 in FIG. 9), the pressure is applied to the one side of the two divided pieces 100'U and 100'L (on the left in FIG. 8), thereby urging the module cover 5 to recover with the deformation of the two divided pieces 100'U and 100'L. Also when the other side of the perpendicular direction is pushed (refer to the arrow F4 in FIG. 9), the pressure is applied to the other side of the two divided pieces 100'U and 100'L (on the right in FIG. 8), thereby urging the module cover 5 with the deformation thereof. The urging force can thus be varied depending on the position of the module cover 5 pushed by the operator at the time of horn operation. Accordingly, a necessary pushing force or operating feeling for the horn operation can be varied as intended.

The two-divided portions allow one piece to be reduced in size (external size of the pieces 100'U and 100'L being reduced in the embodiment), by, for example, increasing a space between the divided pieces 100'U and 100'L, thereby reducing manufacturing cost.

While the invention has been explained with reference to the specific embodiments of the invention, the explanation is illustrative and the invention is limited only by the appended claims.

What is claimed is:

1. An airbag system comprising:
    an airbag,
    a retainer for retaining the airbag thereon,
    a module cover having a vertical wall for covering an outer periphery of the airbag and capable of moving forward toward the retainer and backward to return to an initial position,
    an urging device disposed under the retainer for urging the module cover backward, and
    a horn switch having a moving contact provided to the module cover, said moving contact being brought into conduction when the module cover moves forward;
    wherein said module cover includes a retainer retracting section at the vertical wall, to which the moving contact is provided, said retainer retracting section contacting the retainer when the module cover moves and separating from the retainer when the module cover moves backward, and said retainer includes a cover retracting section facing the retainer retracting section and having a fixed contact so that the fixed contact contacts the moving contact.

2. An airbag system comprising:
    an airbag,
    a retainer for retaining the airbag thereon,
    a module cover having a vertical wall for covering an outer periphery of the airbag and capable of moving forward toward the retainer and backward to return to an initial position,
    an urging device disposed under the retainer for urging the module cover backward, and
    a horn switch having a moving contact provided to the module cover, said moving contact being brought into conduction when the module cover moves forward;
    wherein said urging device is formed of a plate spring member having an outer periphery portion extending laterally outwardly from the retainer and disposed under the vertical wall for supporting the vertical wall of the module cover, said plate spring member moving back the module cover when the module cover is pushed toward the retainer, and
    wherein said plate spring member extends laterally outwardly along a bottom portion of the retainer and protrudes from the bottom portion at the outer periphery portion.

\* \* \* \* \*